H. A. JONES.
DETACHABLE BUTTON.
APPLICATION FILED DEC. 4, 1917.
1,259,871.
Patented Mar. 19, 1918.
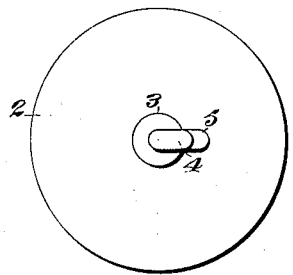
Fig.2.
Fig.1.
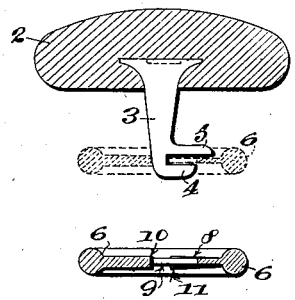
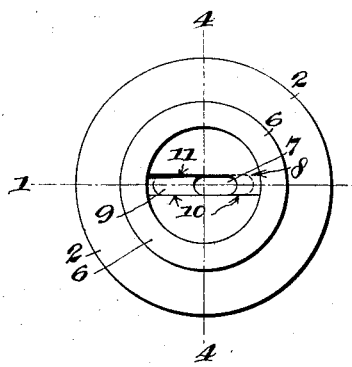
Fig.3.
Fig.4.
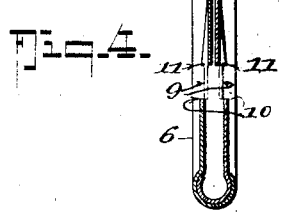
Fig.5.
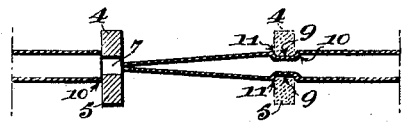
INVENTOR
Harry A. Jones.
BY
Fred G. Dieterich
ATTORNEYS

UNITED STATES PATENT OFFICE.

HARRY A. JONES, OF VANCOUVER, BRITISH COLUMBIA, CANADA.

DETACHABLE BUTTON.

1,259,871.　　　　　　　Specification of Letters Patent.　　Patented Mar. 19, 1918.

Application filed December 4, 1917. Serial No. 205,398.

*To all whom it may concern:*

Be it known that I, HARRY A. JONES, a citizen of the Dominion of Canada, residing at Vancouver, in the Province of British Columbia, Canada, have invented certain new and useful Improvements in Detachable Buttons, of which the following is a specification.

This invention relates to a detachable button of that class wherein the shank of the button is passed through the material to which it is to be attached and has provision for connection to that shank of a washer or back plate preventing its withdrawal.

My object has been to devise a fastening that may be quickly attached or removed when required, and will be secure against accidental removal. The button is also designed to be cheaply manufactured in quantities.

The invention is particularly described in the following specification, reference being made to the drawings by which it is accompanied, in which:

Figure 1 shows in section the button and its fastening washer detached, the section being taken on the line 1—1 in Fig. 3.

Fig. 2 is an inverted plan of the button showing the shank.

Fig. 3, an inverted plan of the fastening washer showing its relation to the button and shank.

Fig. 4 is a section on the line 4—4 showing to a larger scale an alternative construction of the fastening washer, and Fig. 5 is a development of the circumference of the path of the shank key projections on the face of the fastening washer.

All views are shown to a somewhat larger scale than will usually be required.

In these drawings 2 represents the button head and 3 the shank, integral with or secured to the head 2 in any approved manner. The outer end of this shank 3 has key-like projections 4 and 5 at and adjacent its end, the inner one 5 being relatively longer than the outer one 4.

The washer 6, which is removably attached to the end of the shank 3 to retain the button in the cloth, has an elongated aperture 7 adjacent the center, such that it may be passed over the end of the shank and its projections 4, but will not pass over the projection 5. This washer 6 has a beaded outer edge and the thickness of the central portion varies from a thin edge on one side 8 of the aperture 7 that will freely pass between the projections 4 and 5 when the washer 6 is rotated on the stem 3, and the thickness of the central part of the washer increases gradually toward the securing seat 9 which is diametrically opposite the aperture 7 where the thickness closely fits the space between the projections 4 and 5.

This tapered increase of thickness may be from both sides of the aperture 7 toward the securing seat 9, but is preferably only from one side 8, the thickness on the other side of the aperture and on the same side of the securing seat 9, being increased to form a stop shoulder 10, thus definitely locating the washer in the secured position when its seat 9 is between the projections 4 and 5, and in the release position with the outer key member 4 in alinement with the aperture 7.

Immediately adjacent the securing seat 9, a slight elevated ridge 11 may be formed on each face of the washer which the key projections 4 and 5 will spring apart to pass over and which will tend to retain the washer in the secured position unless forcibly rotated to release it.

The washer 6 may be stamped or otherwise formed from solid metal with the thick and thin variations formed on each face so as to be reversible, or as shown in the enlarged cross section in Fig. 4, and in the development in Fig. 5, it may be formed of two pieces stamped from thin sheet metal beaded together at the rim, in which case the faces will have a sufficient measure of resilience to and from one another to exercise a securing hold between the key members 4 and 5. The two parts may be sheared along the line 10 that the sheared edges may form the required shoulders.

The important features of the invention lie in holding the washer 6 tightly between the key projections 4 and 5 of the button shank: in the inner key projection being longer than the outer one whereby the washer is definitely located in the plane of rotation: in the resilient pressure of the washer faces against the key projections, and in the definite location of the key projections in the two positions of the retaining seat and the release aperture.

Having now particularly described my invention, I hereby declare that what I claim as new and desire to be protected in by Letters Patent, is:

1. A detachable button, comprising the combination with a button head, having a shank backwardly projecting therefrom, said shank having key portions projecting radially from its end, and a washer apertured to pass over the end of the shank and the outer key projection and susceptible of being rotated between the two projections to a thickened securing seat fitting the space between the two projections.

2. A detachable button, comprising the combination with a button head having a shank backwardly projecting therefrom, said shank having key portions projecting radially from its end and a washer apertured to pass over the end of the shank and the outer key projection and susceptible of being rotated between the two projections to a securing seat resiliently fitting the space between the two projections.

3. A detachable button, comprising the combination with a button head having a shank backwardly projecting therefrom, said shank having key portions projecting radially from its end, the outer key portion being relatively shorter than the inner one and a washer apertured to pass over the end of the shank and the outer key projection and susceptible of being rotated between the two projections to a securing seat tightly fitting the space between the two projections.

4. A detachable button, comprising the combination with a button head having a shank backwardly projecting therefrom, said shank having key portions radially projecting from its end, the outer key portion being relatively shorter than the inner one, and a washer apertured to pass over the end of the shank and the outer key projection and susceptible of being rotated between the two projections to a securing seat tightly fitting the space between the two projections, said washer being stamped from thin sheet metal rim-beaded together, the opposite faces of the washer having a resilient tendency apart to exercise a holding pressure between the key projections of the shank to retain that shank against accidental rotation.

5. A detachable button, comprising the combination with a button head having a shank backwardly projecting therefrom, said shank having key portions radially projecting from its end, the outer key portion being relatively shorter than the inner one, and a washer apertured to pass over the end of the shank and the outer key projection, the opposite faces of said washer being shaped to offer a thin edge along one side of the aperture that it may pass between the key projections of the shank and tapered therefrom to a position diametrically opposite the aperture where a seat is formed tightly fitting the space between the key projections of the shank and shoulders on each face of the washer along one edge of the aperture and along one edge of the securing seat definitely locating the key projections of the shank at each position.

In testimony whereof I affix my signature.

HARRY A. JONES.